(12) United States Patent
Lux (10) Patent No.: US 11,847,101 B1
(45) Date of Patent: Dec. 19, 2023

(54) LOCATION DATA PROCESSING SYSTEM

(71) Applicant: SAP SE, Walldorf (DE)

(72) Inventor: Manuel Lux, Altlussheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/746,331

(22) Filed: May 17, 2022

(51) Int. Cl.
    *G06F 16/21*     (2019.01)
    *G06F 16/29*     (2019.01)
    *G06F 16/245*     (2019.01)
    *G06F 16/22*     (2019.01)

(52) U.S. Cl.
CPC ........ *G06F 16/211* (2019.01); *G06F 16/2282* (2019.01); *G06F 16/245* (2019.01); *G06F 16/29* (2019.01)

(58) Field of Classification Search
None
See application file for complete search history.

(56) References Cited

U.S. PATENT DOCUMENTS

| | | | |
|---|---|---|---|
| 9,104,665 B1 | 8/2015 | Bik et al. | |
| 9,710,475 B1 | 7/2017 | Sudarsanam et al. | |
| 2009/0189901 A1* | 7/2009 | Steinthal | G09B 29/00 345/441 |
| 2014/0358414 A1* | 12/2014 | Ibrahim | G01C 21/10 701/119 |
| 2017/0124116 A1* | 5/2017 | League | G06F 16/29 |
| 2017/0139953 A1* | 5/2017 | Arokiaraj | G06F 16/24575 |
| 2017/0337229 A1* | 11/2017 | Infante Suarez | G06F 16/2246 |
| 2019/0364130 A1 | 11/2019 | Rogynskyy | |
| 2021/0256768 A1 | 8/2021 | Zhao et al. | |
| 2022/0179882 A1* | 6/2022 | Cervantes | G06F 16/29 |
| 2023/0106982 A1 | 4/2023 | David et al. | |

OTHER PUBLICATIONS

Unpublished U.S. Appl. No. 17/746,338, filed May 17, 2022, entitled "Delta Merge With Location Data".

* cited by examiner

*Primary Examiner* — Christopher J Raab
(74) *Attorney, Agent, or Firm* — Sterne, Kessler, Goldstein & Fox P.L.L.C.

(57) ABSTRACT

Disclosed herein are various embodiments of a location data processing system. An embodiment operates by configuring a column of a table to store location-based data across a plurality of different coordinate systems. The location-based data to be stored in the configured column is received. The received location-based data is divided into a plurality of fragments, including a first fragment comprising a plurality of data entries. A first data entry in the first fragment includes a coordinate specification including metadata indicating how to evaluate corresponding location-based data of a first coordinate system represented by the first data entry. A query for data from the first fragment is received. The plurality of data entries of the first fragment are evaluated based on the coordinate specification to identify data that satisfies the query. The data is returned responsive to the query.

20 Claims, 5 Drawing Sheets

LOCATION DATA PROCESSING SYSTEM

CROSS-REFERENCE TO RELATED APPLICATIONS

This application is related to "Delta Merge with Location Data" U.S. patent application Ser. No. 17/746,338, to Lux, filed on May 17, 2022, which is herein incorporated by reference in its entirety.

BACKGROUND

Location data is any data that indicates the location of a particular object or the bounds of a geographic area. Location data can be stored or captured or interpreted using any different number of coordinate systems. Location data is often stored in a database.

Databases often require an administrator to make a declaration as to the types of location data the table will store at the time of table creation. However, this can be problematic when it is unclear at the design or creation time of database table, according to which coordinate system(s) the location data to be stored in the table will be interpreted.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Location data is any data that indicates the location of a particular object or the bounds of a geographic area. Location data can be stored or captured or interpreted using any different number of coordinate systems. One well-known example of using a coordinate system to interpret location data is the coordinate system commonly referred to WGS84, which is used by the Global Positioning System (GPS). Location data is often stored in a database.

Databases often require an administrator to make a declaration as to the types of location data the table will store at the time of table creation. However, this can be problematic when it is unclear at the design or creation time of database table, according to which coordinate system(s) the location data to be stored in the table will be interpreted.

Figure 1:
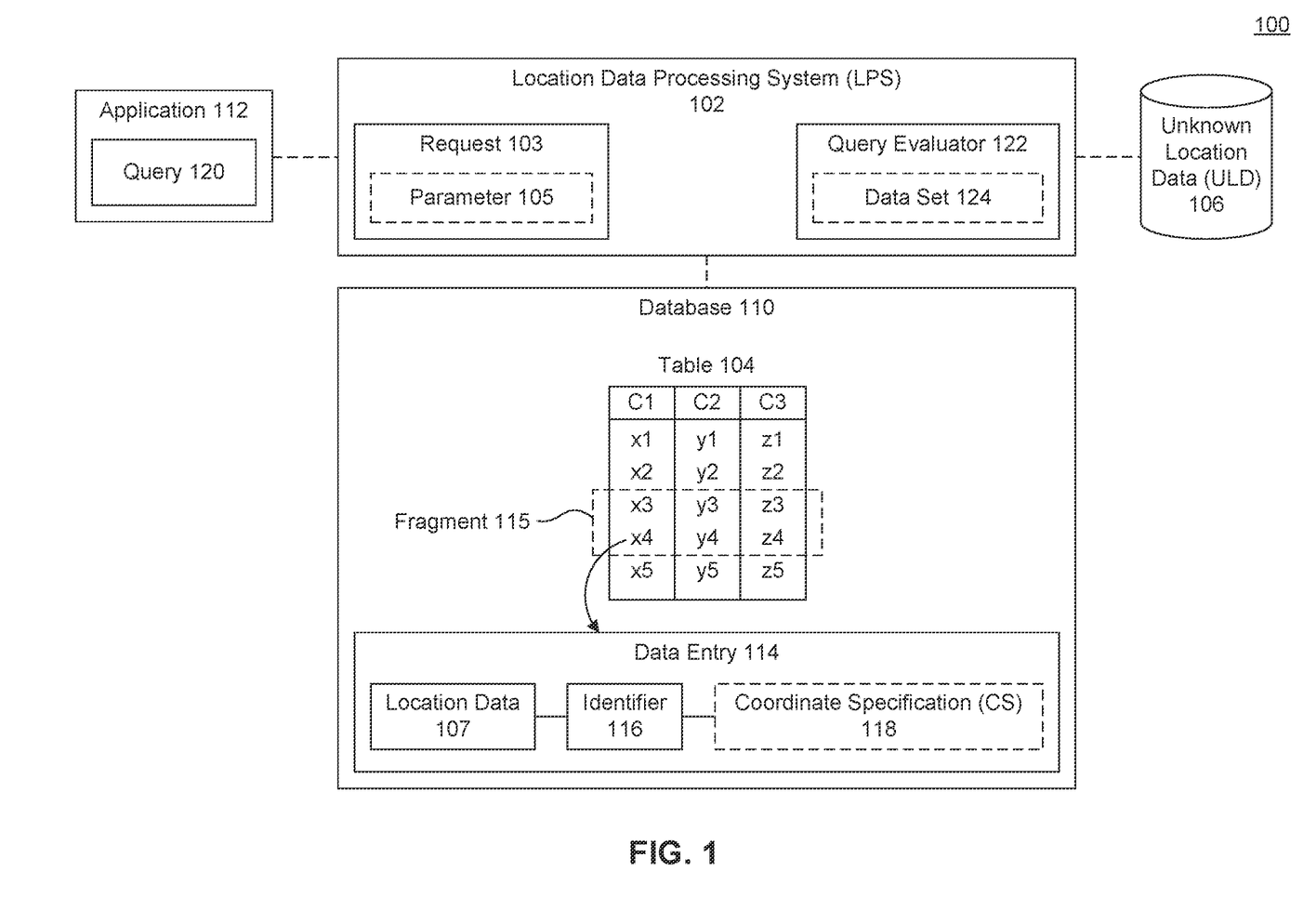
FIG. 1 is a block diagram illustrating functionality for a location data processing system (LPS), according to some example embodiments.

FIG. 1 is a block diagram 100 illustrating functionality for a location data processing system (LPS) 102, according to some example embodiments. In some embodiments, LPS 102 may allow a user, such as a database administrator, to configure one or more columns of a table 104 to store location data from or to be interpreted using a variety of different coordinate systems. LPS 102 configures the table 104 to have the flexibility to store coordinate or location data corresponding to different coordinate systems with minimal or reduced storage consumption relative to using conventional database table definitions.

In some embodiments, different coordinate systems may differ in how they interpret coordinates identifying a particular location or geographic area. For example, the same geographic point may be represented by two different sets of values each corresponding to a different coordinate system, and each with its own unique interpretation or processing in view of that coordinate system.

Location data 106 may include any data used to indicate a location of a person (e.g., electronic device carried by the person), home, vehicle, or bounds of a structure or region across one or more geographic areas. Location data 106 may include data that is used to capture the movement of a person, vehicle, or other object across a geographic area over a time interval. Other example ULD 106 includes a location of a mobile phone, an airplane, or a restaurant; the ULD 106 may indicate the bounds of a city, county, park, or dwelling. In some embodiments, a set of ULD 106 may track the movement of a mobile phone across various time periods and geographies.

As indicated above, ULD 106 may include location data corresponding to one or more of coordinate systems, the identities of which may not be known ahead of time (e.g., when ULD 106 is received or loaded into database 110). A coordinate system is a method or system for identifying a location of a point on the Earth. Example ULD 106 may include latitude and longitude measures, or a distance/direction between a particular identified point and a reference point. Global positioning system (GPS) is one example of how a particular coordinate system (e.g., WGS84) may be used. However, there are many other uses for coordinate systems beyond GPS, and many different types of coordinate systems such as Idaho Transverse Mercator, Virginia Lambert, Mississippi TM, and WISCRS Columbia. In other embodiments, particular systems or applications 112 may use their own independent or unique coordinate systems.

In some embodiments, when a table 104 is created in a database 110, different columns of the table 104 may be configured to store different types of data (e.g., such as integer, string, decimal, real, Boolean, etc.). Configuring each column to a particular data type enables more useful, flexible, and faster data processing and while often consuming less storage space than if every column was designated as a String. One of the drawbacks of using a String designation, in which any data can be stored, is that it consumes more storage than other more narrowly defined data types and includes fewer processing capabilities. For example, two strings that happen to be numbers cannot be summed together through normal data processing (without first being converted to a numerical or other data type, which would consume additional processing resources and storage). A similar issue would arise with location data being stored as Strings.

In some embodiments, a database administrator may request or configure one or more columns of table 104 to store ULD 106 (which consumes less storage space than configuring the same columns as Strings). However, as noted above, ULD 106 may include coordinates or other location data that is to be interpreted according to one or more the coordinate systems (e.g., each coordinate or data entry from ULD 106 corresponding to a particular coordinate system).

In conventional database design, is may be difficult to store location data of an unknown coordinate system, without using the String designation for the column. However, as also noted above, using string as the designated data format would both limit the ability of database 110 to under (e.g., execute queries), process, or perform calculations/transformations on the data (without performing an intermediary transformation, as noted above) as well as consume additional and unnecessary storage capacity, thus degrading overall performance of the database 110 and in particular, any queries executed against table 104.

LPS 102 provides additional flexibility beyond what is offered through conventional database design, by configuring one or more columns (e.g., C1, C2, C3) of table to store any type of ULD 106, across multiple different known coordinate systems. LPS 102 provides a database 110 the flexibility of storing any type of ULD 106 (e.g., location data to be interpreted using any coordinate system) in one or more columns of table 104, with querying capability, while minimizing storage usage relative to designating the columns as Strings.

In conventional database design, the database administrator may either need to know at the time of table definition or creation, specifically, what type of data is being stored in each column, or would need access to the coordinate systems when creating indexes. For location data, a database administrator would need to know ahead of time the exact coordinate system being used for all the location data of a column, and would need to ensure that the column does not include location data of any other coordinate system. By contrast, LPS 102 creates flexibility to store various different types of ULD 106 across different coordinate systems in one or more designated columns (C1, C2, C3) of a table 104. For example, a single column (C1) of table 104 may store data across multiple different coordinate systems, which may be unknown at the time of table creation.

In some embodiments, when creating table 104, a database administrator may submit a request 103 with a parameter 105 indicating how the administer would like to configure one or more columns of table 104. In some embodiments, request 103 and parameter 105 may take the form of a structured query language (SQL) command. An example format for request 103 and parameter 105 is illustrated below.

CREATE[ . . . ] TABLE ([ . . . ] myColumn [PARAMETERS FOR COLUMN],[ . . . ])

In the example request 103 illustrated above, a database administrator may define or create a table, and provide a specific definition or data type for each column indicating the type of data that each column is to be configured to store. The 'myColumn' value represents the name or identifier of a column in which ULD 106 is to be stored. The 'parameters for column' data bracket is a placeholder indicating that the database administrator may enter various combinations of parameters 105 regarding the type(s) of ULD 106 for which the column (myColumn) is to store.

For example, the parameters 105 may indicate whether the ULD 106 includes values for a single point or some geometry other than a point (e.g., multiple points defining the bounds of a line, ellipse, circle, rectangle, polygon, or any other shape). In some embodiments, the geometry may include multiple interrelated points corresponding to a geometric shape. Parameters 105 may also indicate whether there is a known singular coordinate system that is to be used across all the ULD 106 of the column, or whether the ULD 106 to be stored in the column may be of an unknown coordinate system or may span multiple coordinate systems (e.g., in which different coordinate systems may be used to interpret different coordinates or location data in the ULD 106).

In some embodiments, if the coordinate system for the ULD 106 to be stored in the column is known ahead of time (e.g., WGS84, as used by GPS), the identifier 116 for the coordinate system or format may be passed as parameter 105 as part of request 103. For example, a known identifier value 4326 may correspond to WGS84. The identifier value "4326" may be passed as a parameter 105 if only WGS84 formatted or interpreted data is going to be stored in the column. Database 110 may then take advantage of the efficiencies of storing a single format of ULD 106 in the specified column(s).

In some embodiments, if it is unknown how many or which coordinate systems will be used to interpret location data stored in a particular column of table 104, the parameter 105 may include a blank field or NULL value (or other designated value such as "ANY"). LPS 102 may interpret this designated value (e.g., blank, NULL, ANY) as an indication to include the flexibility to configure to the column(s) to store ULD 106 spanning multiple different coordinate systems. In some embodiments, a blank parameter 105 field may indicate to use the default coordinate system (e.g., WGS84, or another previously designated default coordinate system).

In some embodiments, the request 103 may be used to configure multiple columns of table 104 with standard data values (e.g., integer, REAL, Boolean, String, etc.), location data for a single known coordinate system, and/or other columns with location data flexibility as described herein (e.g., with the designated value being included as a parameter 105).

Once the column(s) of table 104 have been configured by LPS 102 or a database system, an application 112 may connect to the table 104 during runtime and store, modify, and read ULD 106 to/from the designated column(s) of table 104. Application 112 may also access the other configured columns which may include other, non-location designated, data. However, the focus herein will be on the storage and management of ULD 106 by LPS 102, particularly ULD 106 of a column(s) configured to and capable of storing location data across multiple different coordinate systems (without storing the data as a String).

Data entry 114 illustrates an expanded view of any given value of the table that is storing ULD 106. Data entry 114 illustrates an example format or structure of how each row of ULD 106 may be stored in table 104, regardless of the particular coordinate system corresponding to the various data entries of ULD 106, according to some embodiments. Data entry 114 also illustrates a structure of how a column of table 104 may be configured to store ULD 106 across multiple coordinate systems.

Location data 107 may be an indication that the specific value(s) of ULD 106 is stored in the first part of a row or record of a column. For example, if ULD 106 is a point (x, y) in GPS, with the values (8,140), then (8,140) may be stored as location data 107. If ULD 106 is a number of different points [(12, 30), (12, 36), (12,42)] or formatted for a different coordinate system (NW, 34, 15), then those values may be stored as location data 107, in the first portion of the data entry 114. In other embodiments, location data 107 may store three or four digit values, and may store groups of values that extend beyond a single point (e.g., ellipses, polygons), that may outline particular geographic areas (e.g., territories, parks, counties, cities, villages, etc.), all or any of which may be stored as location data 107.

Identifier 116 may indicate which coordinate system is to be used to interpret or process the values in of location data 107. In some embodiments, different coordinate systems may correspond to different spatial reference system identifiers, which may include be any alphanumeric string, symbolic, or integer value(s). In an embodiment, the identifier 116 for GPS may be 4326, and for a different coordinate system, the identifier 116 may be A8 or 123.

As noted above, each data entry 114 may correspond to a row or record of table 104. If a table 104 includes 1000 records, that may correspond to 1000 data entries 114. In some embodiments, storage of the various data entries 114 of table 104 may include dividing the entries of each column (or a subset of the columns) into smaller fragments 115.

A fragment 115 may be a subset of rows from a column of table 104 that are stored and managed together. A fragment 115 may include any number of rows or data entries 114. As an example, if table 104 includes 162 data entries 114 or rows, and a fragment 115 stores up to 16 rows, then the column may be divided into 11 column fragments 115 (with ten fragments having 16 entries and, one of the fragments only having 2 data entries), which may be stored and managed independently. However, when performing a query on the column, all 11 fragments 115 may be queried, individually.

In an embodiment, LPS 102 may manage each fragment 115 individually in memory or disk storage. In an embodiment, LPS 102 may scan the identifiers 116 of all the data entries 114 in a particular fragment 115, to determine which coordinate systems are being used across the various data entries 114 of the fragment 115.

Some data entries 114 of a fragment 115 may include a spatial reference system or coordinate specification (CS) 118. CS 118 may include metadata that describes how to interpret, evaluate, transform, process, or query location data 107 corresponding to a particular coordinate system associated with CS 118. Each unique identifier 116 may have its own CS 118. In some embodiments, CS 118 may include functional requirements of a particular coordinate system and how to understand, interpret, and otherwise process the data of a particular coordinate system. CS 118 may provide functionality enabling LPS 102 to interpret, understand, query, or otherwise process location data 107, particularly in responding to one or more queries 120. Because each coordinate system is unique, CS 118 may provide instructions for understanding, interpreting, or otherwise processing the particular values of location data 107 of that particular coordinate system.

LPS 102 may add, include, or otherwise ensure that at least one CS 118 is included for each distinguishable identifier 116 in the column fragment 115 (i.e., delta fragment or delta storage). In some embodiments, each data entry 114 in a fragment 115 (or a subset of the entries) may initially include a CS 118, and LPS 102 may scan the various entries and remove one or more redundancies within the fragment 115. In some embodiments, LPS 102 may have a threshold or limit on how many redundant or duplicate CS 118 may be stored across the data entries 114 for any one particular fragment 115.

In some embodiments, when a new data entry 114 is inserted into table 104 (e.g., in a particular fragment 115), LPS 102 may check to see if its coordinate system is already known to the delta fragment. For example, LPS may ensure that there is at least one data entry 114 in the delta fragment 115) with a CS 118 corresponding to the coordinate system of the new entry. If no CS 118 exists, then a new CS 118 for the new data entry 118 may be stored in the delta fragment 115. This may help LPS 102 ensure that redundancies are not introduced into storage for each fragment 115.

It should be noted that as a result of this process, there is at least one entry 114 in each (delta) fragment 115 that includes a CS 118 for each unique coordinate system identifier 116. For example, if fragment 115 includes sixteen data entries 114, across three different coordinate systems (e.g., there will be three unique identifier 116 values amongst the set of sixteen entries 114 of the fragment 115). Also, the fragment 115 may include one CS 118 for each of the three unique coordinate system identifiers 116. Each CS 118 may then be used (or reused) by database 110 to process any of the data entries 114 of that fragment 115 with an identifier 116 corresponding to the CS 118 (e.g., the three CS 118 may be used to process all sixteen entries).

In this manner, LPS 102 limits storing duplicative CS 118 data in a fragment 115, which has a distinct advantage of saving memory usage and/or storage space, rather than redundantly storing CS 118 for each entry of a fragment 115 (which would consume much more memory or storage space with negligible performance benefit). In some embodiments, a particular CS 118 may be stored multiple times in a fragment 115, but less than all the entries 114 of a fragment include a CS 118, unless every single data entry 114 of the fragment 115 corresponds to or includes a different identifier 116. This is particularly useful in crash recovery, in which each fragment is self-existing and minimized so as to not included unnecessary duplicative data.

In some embodiments, LPS 102 may receive unknown location data (ULD) 106 from a data source and store the data across different fragments 115 across one or more columns of table 104 configured based on request 103. LPS 102 may also process queries 120 that are received from application 112, or a different computing device, on the one or more columns of table 104. Query 120 may include a set of attributes that define the bounds or attributes of the data being requested. An example query 120 may include requesting location data 107 of a column that corresponds to a particular identifier 116.

A query evaluator 122 may receive query 120, and evaluate the various fragments 115 of column to identify any data entries 114 that satisfy the query 120. In some embodiments, the query 120 may only request data of a particular coordinate system, in other embodiments, the query 120 may be for data across different coordinate systems. Query evaluator 122 may use the CS 118 stored or appended to a subset of the data entries 114 of a particular fragment 115 to perform the query 120 with regard to the data entries 114. The values or identifiers of any matching or satisfying data entries 114 may then be stored as part of data set 124. Once all the fragments are evaluated, various fragments may be evaluated in parallel, the final data set 124 is returned to the requesting computing device, client, or application 112.

In some embodiments, table 104 may be used as a storage container to store ULD 106 that may or may not span multiple coordinate systems. Then, through queries and copy commands, the stored location data 107 may be separated by identifier 116 and stored in a specific table or column configured for each unique identifier 116.

Figure 2:
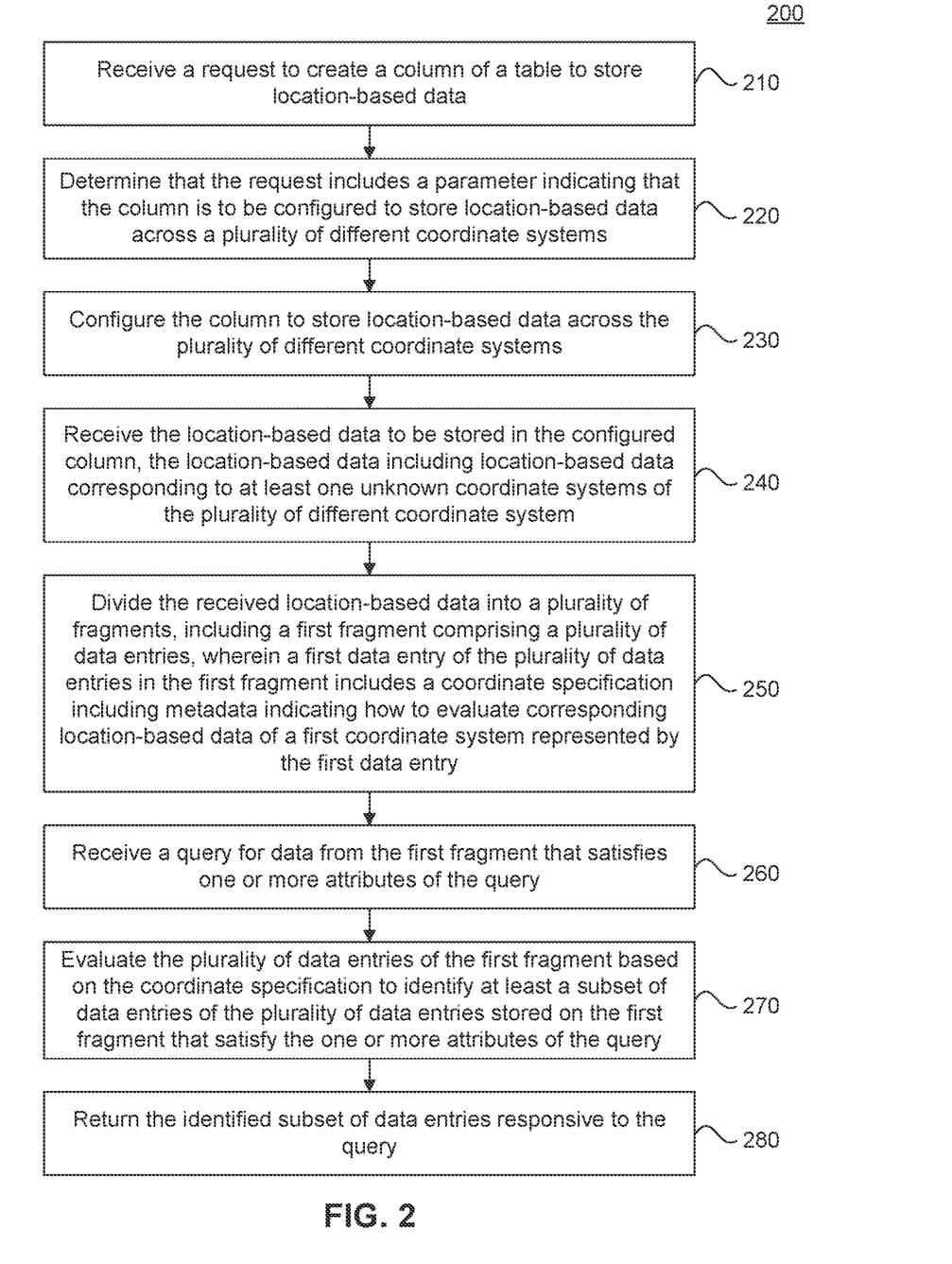
FIG. 2 is a flowchart illustrating example operations for functionality for a location data processing system (LPS), according to some embodiments.

FIG. 2 is a flowchart 200 illustrating example operations for functionality for a location data processing system (LPS) 102, according to some embodiments. Method 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to the figures.

At 210, a request to create a column of a table to store location-based data is received. For example, LPS 102 may receive a query 103 to create a table 104 including one or more columns C1, C2, C3 configured to store ULD 106. In some embodiments, the query 103 may take the form of an SQL command.

At 220, it is determined that the request includes a parameter indicating that the column is to be configured to store location-based data across a plurality of different coordinate systems. For example, LPS 102 may identify zero or more parameters 105 that communicate how to configure one or more columns of table 104 to store ULD 106 across one or more coordinate systems. In some embodiments, LPS 102 may have a default coordinate system (e.g., such as WGS84) which may be used for ULD 106 if no additional parameters 105 are provided.

At 230, the column is configured to store location-based data across the plurality of different coordinate systems. For example, LPS 102 may configure (or may instruct database 110 to configure) columns C1, C2, and C3 of table 104 in accordance with request 103 and parameters 105. Each column may then store data that corresponds to the configuration when it is received from application 112 or another storage device; one or more columns may be configured to store ULD 106 across a variety of different coordinate systems. Data entry 114 illustrates an example of how data of a record may be structured, which includes a location data entry 107 and an identifier 116, and optionally a CS 118 for processing any data entry 107 corresponding to the identifier 116. This data entry structure 114 enables a single column or set of columns of table 104 to store ULD 106 across multiple different coordinate systems, while increasing storage efficiency and processing capabilities relative to using a more general String data format.

At 240, the location-based data to be stored in the configured column is received, the location-based data including location-based data corresponding to at least one unknown coordinate systems of the plurality of different coordinate systems. For example, LPS 102 may receive various records of ULD 106, the records being used with or across multiple, coordinate systems. In some embodiments, LPS 102 may not be able to identify which coordinate system (s) are included in the received ULD 106 until after the ULD 106 is received (e.g., and stored or otherwise processed), as such the coordinate system(s) may be unknown. In some embodiments, two or more different unknown or arbitrary coordinate systems (e.g., not known until receipt or storage) may be used to interpret the records of the ULD 106.

At 250, the received location-based data is divided into a plurality of fragments, including a first fragment comprising a plurality of data entries, wherein a first data entry of the plurality of data entries in the first fragment includes a coordinate specification including metadata indicating how to evaluate corresponding location-based data of a first coordinate system represented by the first data entry. For example, a fragment 115 may include a plurality of data entries 114, each with its own location data 107 and identifier 116 values. And a subset (at least one data entry 114 but fewer than all the data entries 114 of the fragment 115) of the data entries 114 may include a CS 118. In the fragment 115, at least one CS 118 may be appended to a data entry 114 for each unique identifier 116 value. For example, if the various data entries 114 of fragment 115 include thirty data entries spanning four different identifiers 116, then there would be at least four CS 118 appended to data entries 114 across the fragment 115.

At 260, a query for data from the first fragment that satisfies one or more attributes of the query is received. For example, query evaluator 122 may receive query 120 for one or more records of table 104. The query 120 may include different attributes or values that must be satisfied by the requested records or data entries 114.

At 270, the plurality of data entries of the first fragment is evaluated based on the coordinate specification to identify at least a subset of data entries of the plurality of data entries stored on the first fragment that satisfy the one or more attributes of the query. For example, query evaluator 122 may evaluate the query 120 against each of the various fragments 115 (only one fragment 115 is illustrated in the example of FIG. 1, however each column may include one or more fragments 115) of the specified column(s) indicated by query 120. Query evaluator 122 may identify which (if any) records of that fragment 115 satisfy query 120, and those record(s) may be stored in a database 110. As noted above, query evaluator 122 may use CS 118 of a particular data entry 114 in fragment 115 to evaluate any location data 107 in any of the data entries 114 of the fragment 115. In some embodiments, query evaluator 122 may use CS 118 as may already be stored in metadata (e.g., metadata 310A as described below with regard to FIG. 3) to evaluate any location data 107 in any of the data entries 114 of the fragment 115.

At 280, the identified subset of data entries is returned responsive to the query. For example, LPS 102 may return dataset 124 to application 112 or the computing device from which query 120 was received.

Figure 3:
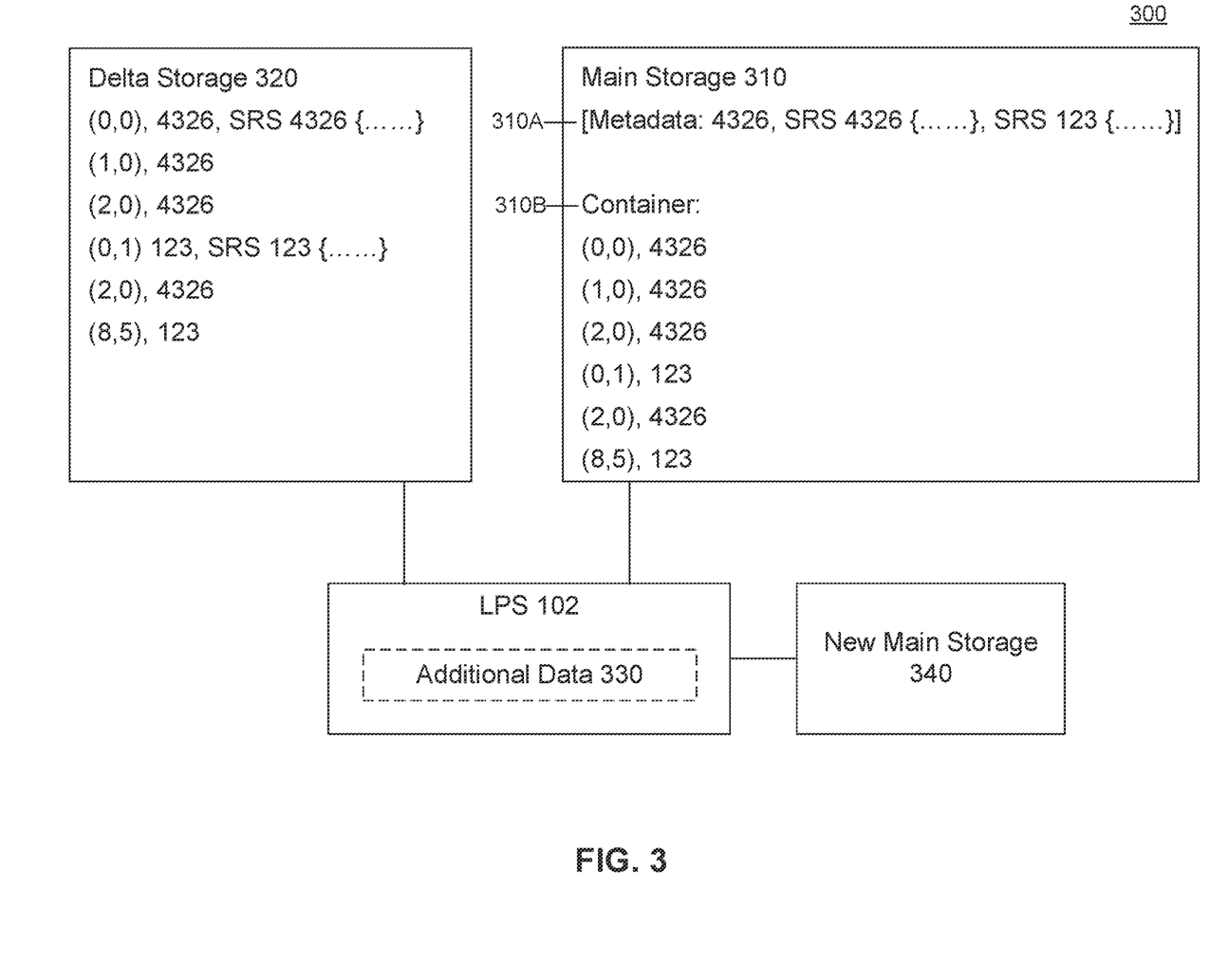
FIG. 3 is a block diagram illustrating functionality for performing a merge operation by a location data processing system (LPS), according to some example embodiments.

FIG. 3 is a block diagram 300 illustrating functionality for performing a merge operation by a location data processing system (LPS) 102, according to some example embodiments.

LPS 102 may store or have access to a database 110 or other storage medium or device, such as disk storage, where a main storage 310 is located. Main storage 310 may include data of a database 110 that has been read-optimized and stored in disk or memory storage. In some embodiments, main storage 310 may be read-only storage. Delta storage 320 may include modifications (from adding data, deleting data, or modifying data) to the data of main storage 310, which has not yet been integrated into, read-optimized for, or persisted to the main storage 310. The example illustrated only includes ULD 106 (corresponding multiple coordinate systems), however it is understood that in other embodiments, other single coordinate system location data and non-location data (e.g., integer, Boolean, string, etc.) may also be integrated into main storage 310 during the delta merge operations.

Periodically, LPS 102 may perform a delta merge operation in which location data from delta storage 320 is merged with location data in main storage 310 into a new main storage 340. New main storage 340 may include a metadata section and container section similar to that illustrated for main storage 310. The metadata section of the new main storage 340 may include the existing metadata 310A from main storage 310 and any new CS 118 that have been identified from delta storage 320 (that were not previously included in metadata 310A. New main storage 340 may also include the data from container 310B as it has been combined with the data from delta storage 320, and read-optimized.

LPS 102, in performing the delta merge operation, accounts for the possibility that the coordinate specifications 118 of the delta storage 320 may be different from the coordinate specifications 118 of the main storage 310. For example, a data entry in data storage 320 may include an identifier 116 that is not included in the metadata 310A of as an identifier 116 in any data entry of main storage 310.

In some embodiments, LPS 102 may divide main storage 310 into two portions: a metadata 310A portion that stores the coordinate specifications 118 for the data entries, and a container 310B portion storing the location data 107 and identifiers 116. As just noted, metadata 310A may include the coordinate specifications 118 for the various identifiers 116 across the data entries in container 310B. For example, SRS 4326 may be used by LPS 102 evaluate the entries with the corresponding identifier 4326, similarly SRS 123 may be used by LPS 102 to evaluate the entries with the corresponding identifier 123.

As illustrated, to save space, LPS 102 may strip the individual data entries of delta storage 320 of their CS 118 entries, and store the CS 118 metadata in the metadata portion of new main storage 340. If the CS 118 entry is already included in metadata 310A, then the metadata of new main storage 340 may just be a copy of metadata 310A. If the CS 118 entry is not included in metadata 310A, then the CS 118 may be added to metadata of new main storage 340. For example, prior to the delta merge operation, metadata 310A may have only included SRS 4326, and SRS 123 may be added after or as part of the delta merge operation.

As a result of the delta merge operation, the entries of delta storage 320 and the main storage 310 may be stored in a newly created main storage 340, in a read-optimized format with metadata of the new main storage 340 including the metadata 310 and CS 118 values, and the container of the new main storage 340 including the location data 107 and identifier values 116 (as illustrated) in both the container 310B and delta storage 320. Then, the storage space of delta storage 320 and main storage 310 may then be freed up or marked for garbage collection and delta storage 320 and the old or previous main storage 310 may be deleted, or used to store new values.

Figure 4:
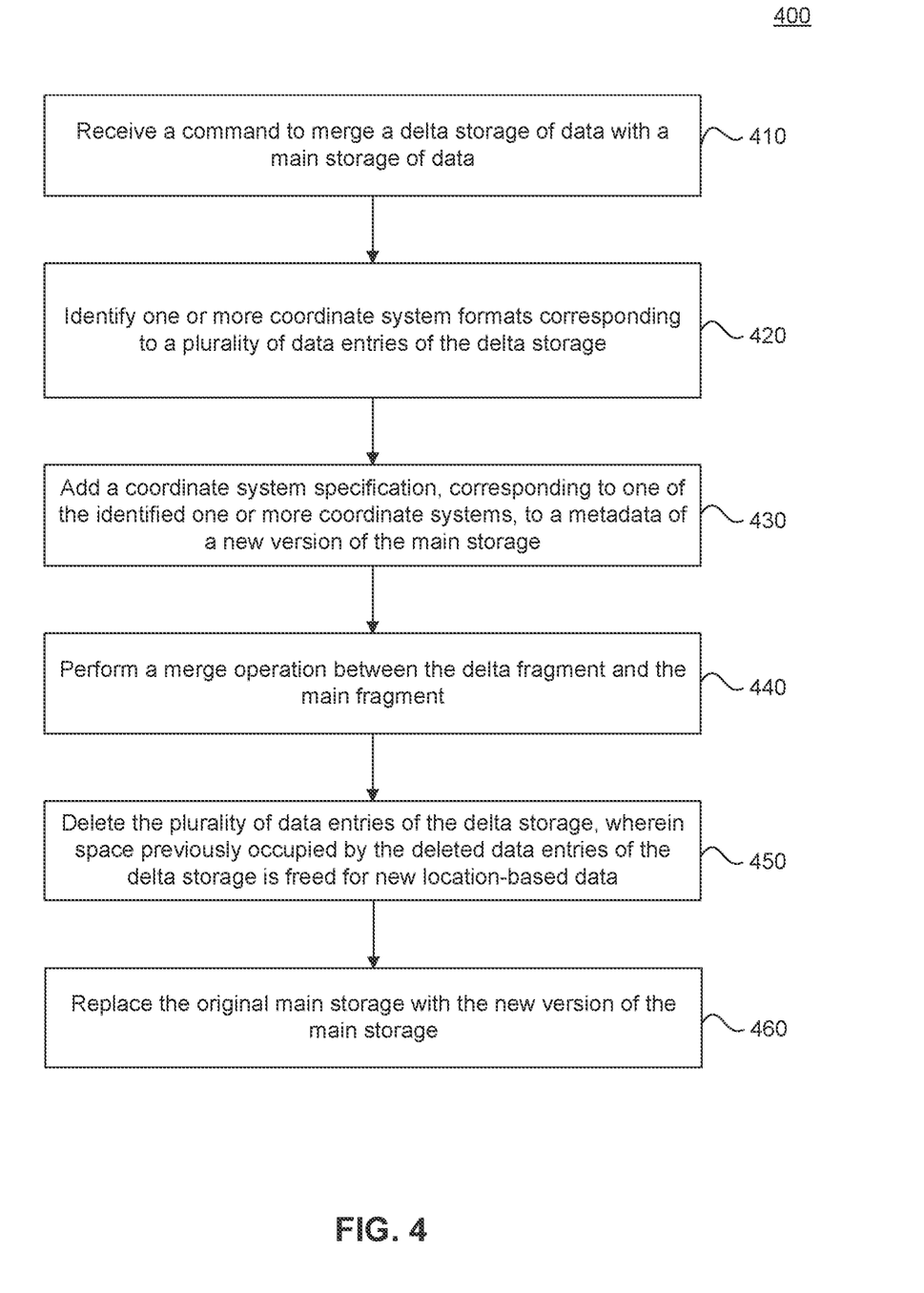
FIG. 4 is a flowchart illustrating example operations for functionality for performing a merge operation by a location data processing system (LPS), according to some embodiments.

FIG. 4 is a flowchart 400 illustrating example operations for functionality for performing a merge operation by a location data processing system (LPS) 102, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to the figures, particularly FIG. 3.

At 410, a command to merge a delta storage of data with a main storage of data is received. For example, request 103 may include a merge command. Or, for example, LPS 102 or database 110 may periodically (every 4 minutes, or every thirty entries to delta storage 320) automatically perform a merge operation.

At 420, one or more coordinate systems corresponding to a plurality of data entries of the delta storage are identified. For example, LPS 102 may determine that there are two coordinate systems in the entries of delta storage 320, corresponding to the identifiers 4326 and 123.

At 430, a coordinate system specification, corresponding to one of the identified one or more coordinate systems, is added to a metadata of a new version of the main storage. For example, LPS 102 may add the coordinate system specification SRS 123 to a metadata portion of new main storage 340 during the delta merge operation, which may also include a copy of the data or values from metadata 310A.

At 440, a merge operation between the delta fragment and the main fragment is performed. For example, LPS 102 may copy the data entries of delta storage 320 into a container portion of new main storage, the container portion may include a copy of the data from container 310B. In some embodiments, LPS 102 may strip any entries with CS 118 appended to them in delta storage 320 (e.g., the entries (0,0) and (0,1)) prior to the copy command. As a result of the delta merge, new main storage 340 may include all the data entries of delta storage 320 and container 310B. In some embodiments, the entries may be reordered and intermingled with pre-existing entries in the container 310B for read-optimization.

At 450, the plurality of data entries of the delta storage is deleted. For example, LPS 102 may delete the entries of delta storage 320 and that space may be made available to other processes or to receive new/additional delta entries. For example, new location data may be received from application 112 and be stored in the emptied delta storage 320 until the next delta merge operation is performed.

At 460, the original main storage is replaced with the new version of the main storage. For example, LPS 102 may activate or make available new main storage 340, such that any subsequent queries are executed against new main storage 340 instead of main storage 310, which may be marked for garbage collection or deleted.

Figure 5:
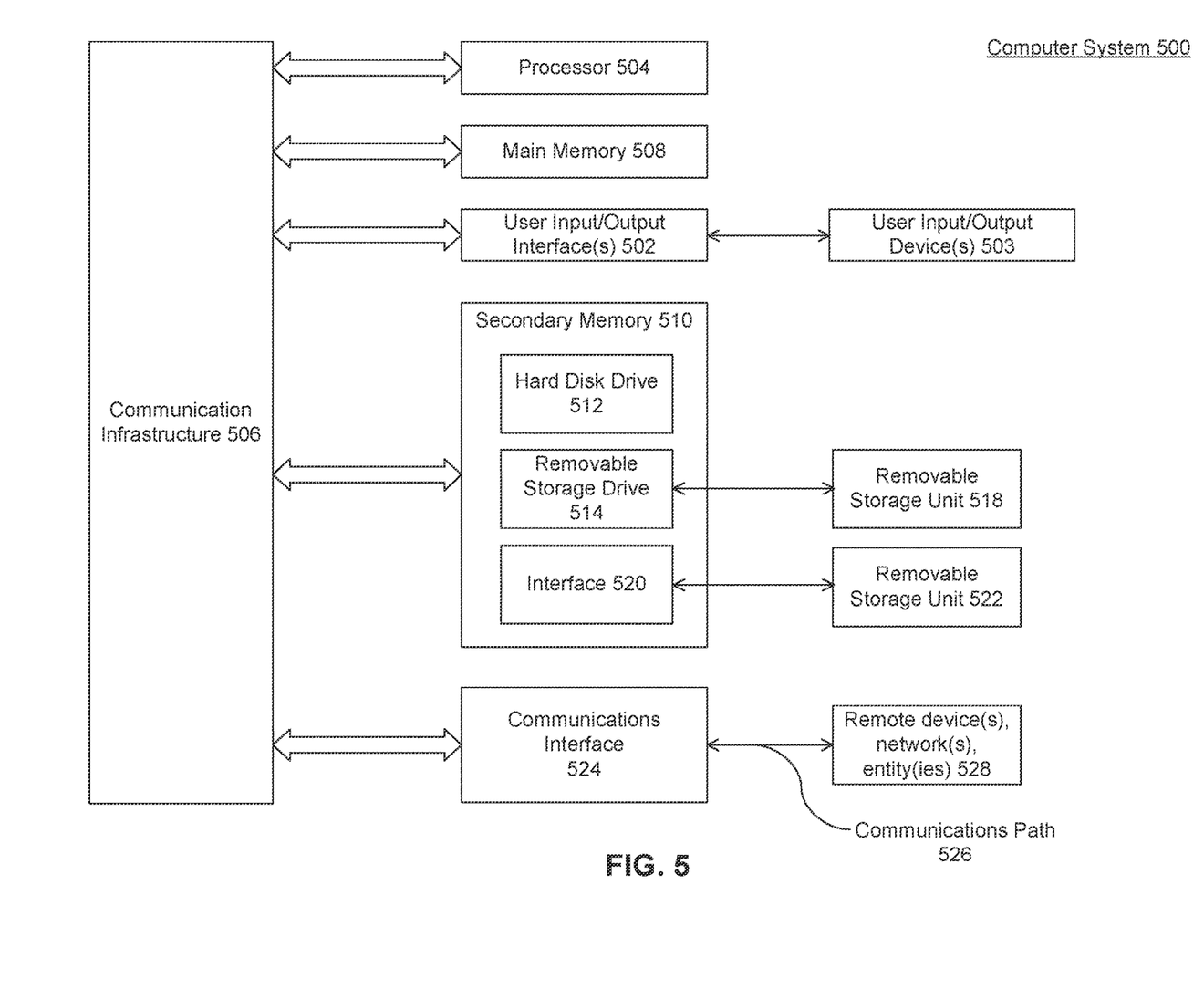
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include customer input/output device(s) 503, such as monitors, keyboards, pointing devices, etc., which may communicate with communication infrastructure 506 through customer input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random-access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" and/or cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "some embodiments" "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
    receiving a request to create a column of a table, the request indicating that the column is for storing location-based data;
    determining that the request includes a parameter indicating that the column is to be configured to store location-based data across a plurality of different coordinate systems;
    configuring the column to store location-based data across the plurality of different coordinate systems, wherein each data entry in the configured column includes both specific location-based data for one of the plurality of different coordinate systems and an identifier as to which of the different coordinate systems the specific location-based data corresponds;
    receiving the location-based data to be stored in the configured column, the location-based data including location-based data corresponding to at least one unknown coordinate systems of the plurality of different coordinate systems, wherein an identity of the unknown coordinate system is unknown at the receiving;
    dividing the received location-based data into a plurality of fragments, including a first fragment comprising a plurality of data entries, wherein a first data entry of the plurality of data entries in the first fragment includes a coordinate specification including metadata indicating how to evaluate corresponding location-based data of a first coordinate system represented by the first data entry;
    receiving a query for data from the first fragment that satisfies one or more attributes of the query;
    evaluating of the plurality of data entries of the first fragment based on the coordinate specification to identify at least a subset of data entries of the plurality of data entries stored on the first fragment that satisfy the one or more attributes of the query; and
    returning the identified subset of data entries responsive to the query.

2. The method of claim 1, wherein a second data entry of the plurality of data entries of the first fragment includes a different coordinate specification including metadata indicating how to evaluate corresponding location-based data of the difference a second coordinate system represented by the second data entry, wherein the second coordinate system is different from the at least one unknown coordinate system represented by the first data entry.

3. The method of claim 1, wherein a second data entry of the plurality of data entries of the first data fragment includes an identifier of the first coordinate system, and wherein the evaluation of the second data entry is based on the coordinate specification of the first data entry.

4. The method of claim 1, wherein the first coordinate system is used in a global positioning system (GPS).

5. The method of claim 1, wherein the specific location-based data corresponds to a point.

6. The method of claim 1, wherein the specific location-based data corresponds to a polygon.

7. The method of claim 1, wherein the parameter is a NULL parameter.

8. A system, comprising at least one processor configured to perform instructions, the instructions comprising:
    receiving a request to create a column of a table, the request indicating that the column is for storing location-based data;
    determining that the request includes a parameter indicating that the column is to be configured to store location-based data across a plurality of different coordinate systems;
    configuring the column to store location-based data across the plurality of different coordinate systems, wherein each data entry in the configured column includes both specific location-based data for one of the plurality of different coordinate systems and an identifier as to which of the different coordinate systems the specific location-based data corresponds;
    receiving the location-based data to be stored in the configured column, the location-based data including location-based data corresponding to at least one unknown coordinate systems of the plurality of different coordinate systems, wherein an identity of the unknown coordinate system is unknown at the receiving;
    dividing the received location-based data into a plurality of fragments, including a first fragment comprising a plurality of data entries, wherein a first data entry of the plurality of data entries in the first fragment includes a coordinate specification including metadata indicating how to evaluate corresponding location-based data of a first coordinate system represented by the first data entry;
    receiving a query for data from the first fragment that satisfies one or more attributes of the query;
    evaluating of the plurality of data entries of the first fragment based on the coordinate specification to identify at least a subset of data entries of the plurality of data entries stored on the first fragment that satisfy the one or more attributes of the query; and
    returning the identified subset of data entries responsive to the query.

9. The system of claim 8, wherein a second data entry of the plurality of data entries of the first fragment includes a different coordinate specification including metadata indicating how to evaluate corresponding location-based data of the difference a second coordinate system represented by the second data entry, wherein the second coordinate system is different from the at least one unknown coordinate system represented by the first data entry.

10. The system of claim 8, wherein a second data entry of the plurality of data entries of the first data fragment includes an identifier of the first coordinate system, and wherein the evaluation of the second data entry is based on the coordinate specification of the first data entry.

11. The system of claim 8, wherein the first coordinate system is used in a global positioning system (GPS).

12. The system of claim 8, wherein the specific location-based data corresponds to a point.

13. The system of claim 8, wherein the specific location-based data corresponds to a polygon.

14. The system of claim 8, wherein the parameter is a NULL parameter.

15. A non-transitory computer-readable medium having instructions stored thereon that, when executed by at least one computing device, cause the at least one computing device to perform operations comprising:
- receiving a request to create a column of a table, the request indicating that the column is for storing location-based data;
- determining that the request includes a parameter indicating that the column is to be configured to store location-based data across a plurality of different coordinate systems;
- configuring the column to store location-based data across the plurality of different coordinate systems, wherein each data entry in the configured column includes both specific location-based data for one of the plurality of different coordinate systems and an identifier as to which of the different coordinate systems the specific location-based data corresponds;
- receiving the location-based data to be stored in the configured column, the location-based data including location-based data corresponding to at least one unknown coordinate systems of the plurality of different coordinate systems, wherein an identity of the unknown coordinate system is unknown at the receiving;
- dividing the received location-based data into a plurality of fragments, including a first fragment comprising a plurality of data entries, wherein a first data entry of the plurality of data entries in the first fragment includes a coordinate specification including metadata indicating how to evaluate corresponding location-based data of a first coordinate system represented by the first data entry;
- receiving a query for data from the first fragment that satisfies one or more attributes of the query;
- evaluating of the plurality of data entries of the first fragment based on the coordinate specification to identify at least a subset of data entries of the plurality of data entries stored on the first fragment that satisfy the one or more attributes of the query; and
- returning the identified subset of data entries responsive to the query.

16. The non-transitory computer-readable medium of claim 15, wherein a second data entry of the plurality of data entries of the first fragment includes a different coordinate specification including metadata indicating how to evaluate corresponding location-based data of the difference a second coordinate system represented by the second data entry, wherein the second coordinate system is different from the at least one unknown coordinate system represented by the first data entry.

17. The non-transitory computer-readable medium of claim 15, wherein a second data entry of the plurality of data entries of the first data fragment includes an identifier of the first coordinate system, and wherein the evaluation of the second data entry is based on the coordinate specification of the first data entry.

18. The non-transitory computer-readable medium of claim 15, wherein the first coordinate system is used in a global positioning system (GPS).

19. The non-transitory computer-readable medium of claim 15, wherein the specific location-based data corresponds to a point.

20. The non-transitory computer-readable medium of claim 15, wherein the specific location-based data corresponds to a polygon.

* * * * *